US 10,706,135 B2

United States Patent
Babuscov et al.

(10) Patent No.: US 10,706,135 B2
(45) Date of Patent: Jul. 7, 2020

(54) FINGERPRINT AUTHENTICATION MECHANISM

(71) Applicant: Ricoh Company, Ltd., Tokyo (JP)

(72) Inventors: Petru Cristian Babuscov, TImisoara (RO); Marcel Stoica, Timisoara (RO); Joseph Wayne Stradling, Firestone, CO (US)

(73) Assignee: Ricoh Company, Ltd., Tokyo (JP)

( * ) Notice: Subject to any disclaimer, the term of this patent is extended or adjusted under 35 U.S.C. 154(b) by 271 days.

(21) Appl. No.: 15/906,842

(22) Filed: Feb. 27, 2018

(65) Prior Publication Data

US 2019/0266313 A1  Aug. 29, 2019

(51) Int. Cl.
   G06F 21/32  (2013.01)
   G06F 21/60  (2013.01)
   G06F 21/64  (2013.01)

(52) U.S. Cl.
   CPC .......... G06F 21/32 (2013.01); G06F 21/602 (2013.01); G06F 21/64 (2013.01); G06F 2221/2103 (2013.01)

(58) Field of Classification Search
   CPC ...................................................... G06F 21/32
   USPC .......................................................... 726/19
   See application file for complete search history.

(56) References Cited

U.S. PATENT DOCUMENTS

| | | | |
|---|---|---|---|
| 7,581,243 B2 | 8/2009 | Shigeeda | |
| 7,607,018 B2 | 10/2009 | Baxter et al. | |
| 8,484,316 B2 | 7/2013 | Robinson et al. | |
| 8,743,382 B2 | 6/2014 | Manchala | |
| 8,824,835 B2 | 9/2014 | Piersol et al. | |
| 8,959,650 B1* | 2/2015 | Richards | G06F 21/44 709/227 |
| 2008/0189772 A1* | 8/2008 | Sims | G06F 21/445 726/5 |
| 2017/0322794 A1* | 11/2017 | Ferlitsch | G06F 8/65 |

FOREIGN PATENT DOCUMENTS

| | | |
|---|---|---|
| CN | 202472646 | 10/2012 |
| JP | 2016513383 | 5/2016 |

OTHER PUBLICATIONS

Holz, R., Amann, J., Mehani, O. et al. (2015). TLS in the wild: an Internet-wide analysis of TLS-based protocols for electronic communication, 16 pages.

* cited by examiner

*Primary Examiner* — Peter C Shaw
(74) *Attorney, Agent, or Firm* — Jaffery Watson Mendonsa & Hamilton LLP (57) ABSTRACT

A system to generate perform document optimizations is described. The system includes at least one physical memory device and one or more processors coupled with the at least one physical memory device, the one or more processors to receive a request to securely communicate with a client computing device, including a fingerprint identifier (ID) associated with the client computing device, transmit a fingerprint challenge to the client computing device, wherein the fingerprint challenge comprises a manipulation to be performed on a segment of a fingerprint file associated with the fingerprint ID, receive a challenge response from the client computing device and verify the challenge response.

17 Claims, 8 Drawing Sheets

FINGERPRINT AUTHENTICATION MECHANISM

FIELD

This invention relates generally to the field of secure server to server communications.

BACKGROUND

Currently, server to server communication requires secure channel and authentication to prevent unauthorized access of confidential data. One authentication strategy involves Secure Sockets Layer (SSL)/Transport Layer Security (TLS) mutual authentication, which requires two certificates (e.g., server and client certificates). However, issuing, managing, and installing certificates can be difficult to manage and requires a relatively complex process to validate certificates. SSL/TSL provides an efficient mechanism for securely identifying servers on the internet using a trusted certificate authority, but is not practical for client-side authentication.

Another authentication strategy is an implementation of JavaScript Object Notation (JSON) Web Tokens. Using this strategy, a client is assigned a set of credentials that may be used for obtaining limited use tokens, which expire after a set period. Using this scheme in conjunction with server-based SSL/TLS encryption is secure. However, attackers may gain access to the tokens or credentials that are exchanged between the client and server if the encryption layer is broken. Once the credentials or tokens are intercepted the attackers gains access.

Accordingly, an efficient authentication mechanism is desired.

SUMMARY

In one embodiment, a method is disclosed. The method includes a server computing device receiving a request to securely communicate with a client computing device, including a fingerprint identifier (ID) associated with the client computing device, the server computing device transmitting a fingerprint challenge to the client computing device, wherein the fingerprint challenge comprises a manipulation to be performed on a segment of a fingerprint file associated with the fingerprint ID, the server computing device receiving a challenge response from the client computing device and the server computing device verifying the challenge response.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

A fingerprint authentication mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
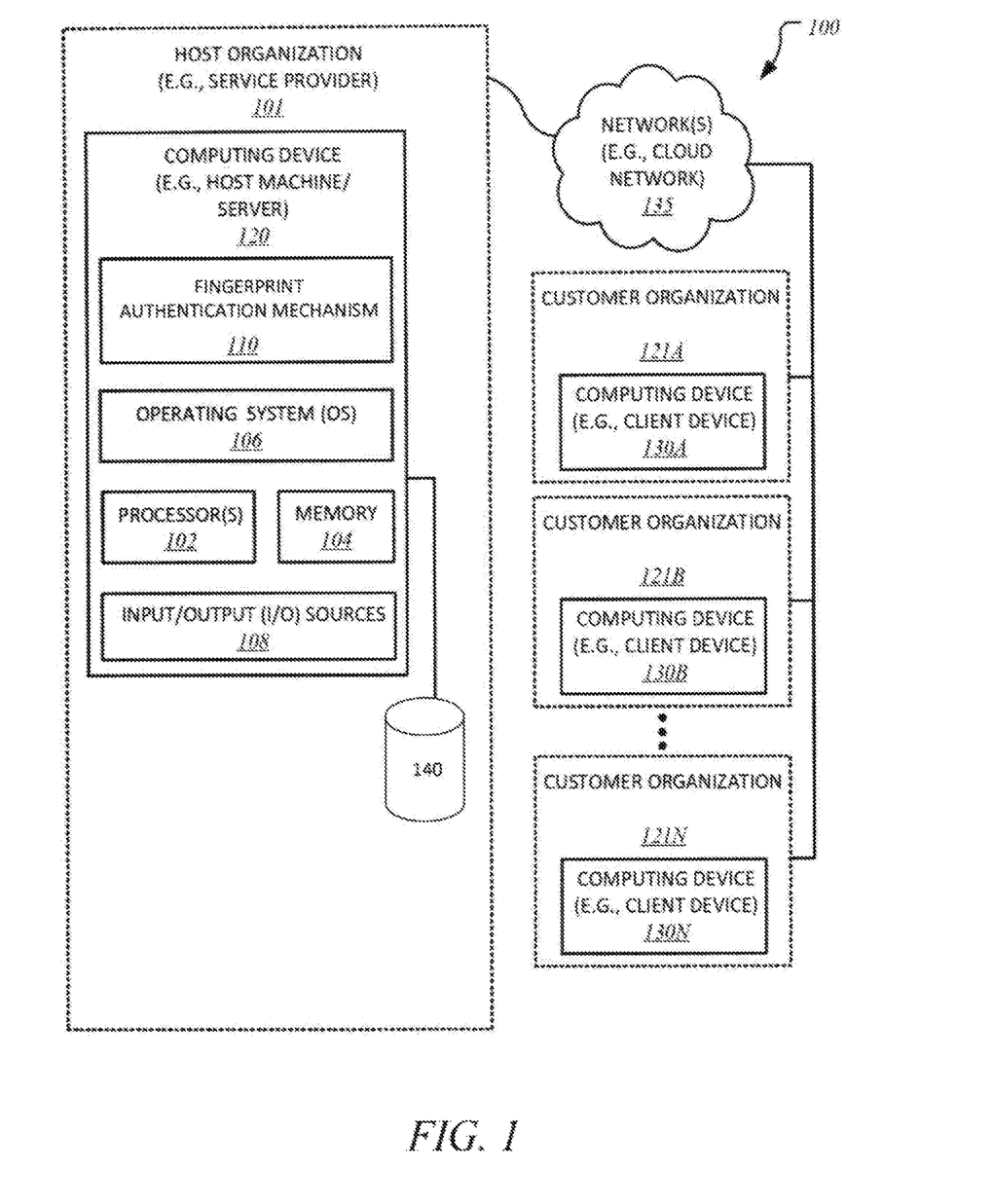
FIG. 1 illustrates a system having a computing device employing a fingerprint authentication mechanism according to one embodiment.

FIG. 1 illustrates a system 100 having a computing device 120 employing a fingerprint authentication mechanism 110 according to one embodiment. In one embodiment, computing device 120 includes a host server computer serving as a host machine for employing fingerprint authentication mechanism 110 to facilitate authentication for server to server (or client) communication. Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database(s) 140 store (without limitation) information and underlying database records having customer and user data therein on to process documents and/or print jobs on behalf of customer organizations 121A-N. In some embodiments, host organization 101 receives input and other requests from a plurality of customer organizations 121A-N over one or more networks 135; for example, incoming print job and/or document processing requests, or other inputs may be received from customer organizations 121A-N to be processed using database system 140.

In one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101. For example, incoming requests received at the web server may specify print services from host organization 101 that are to be provided. Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

Figure 2:
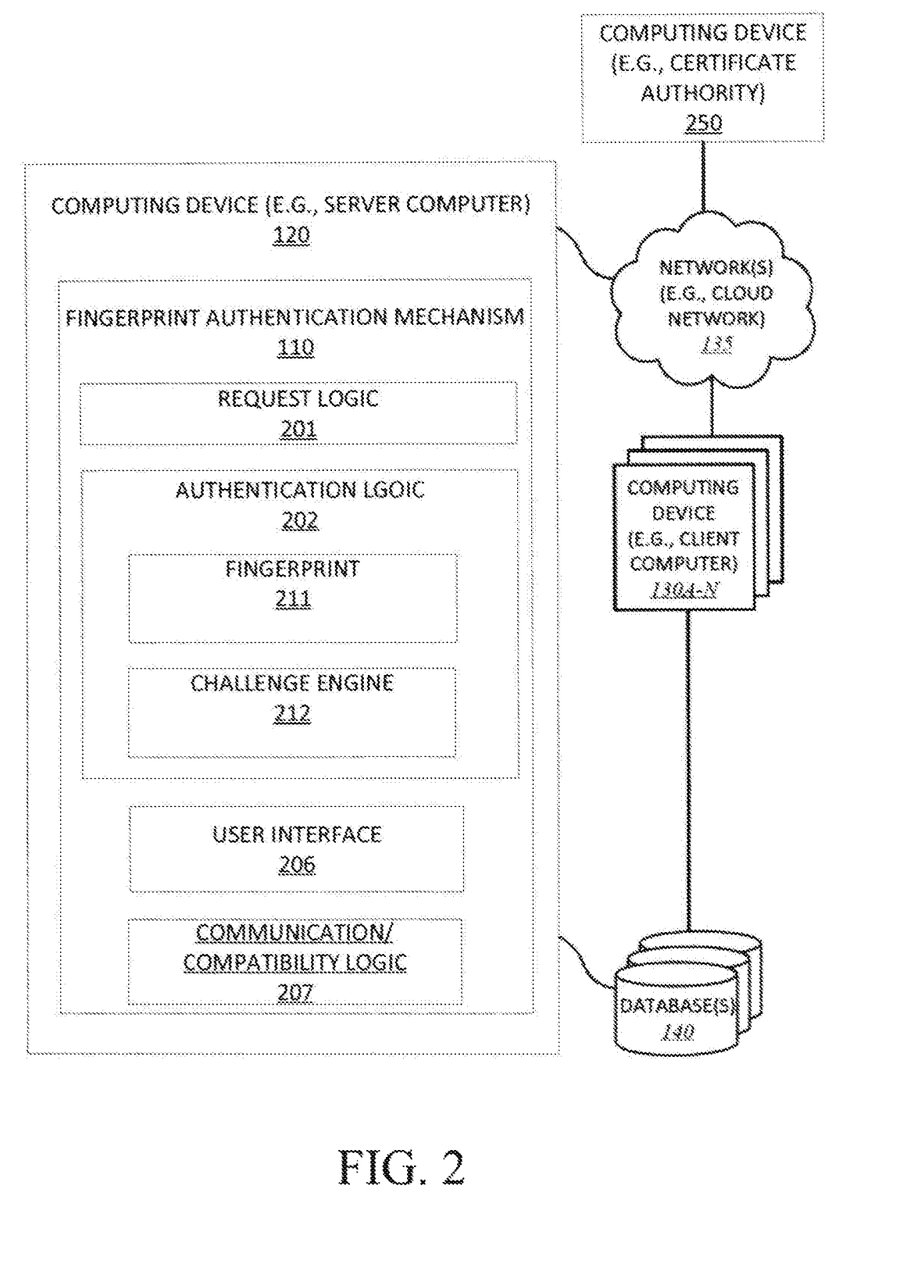
FIG. 2 illustrates a fingerprint authentication mechanism according to one embodiment.

FIG. 2 illustrates fingerprint authentication mechanism 110 of FIG. 1 according to one embodiment. In one embodiment, fingerprint authentication mechanism 110 may include any number and type of components, such as request logic 201, authentication logic 202, user interface 206 and communication/compatibility logic 207.

In one embodiment, computing device 120 may include a server computer which may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 130A-N, over one or more networks, such as network(s) 135.

In one embodiment, computing device 120 may serve as a service provider core for hosting and maintaining fingerprint authentication mechanism 110 to facilitate secure communication with one or more client computers 130A-N, over one or more network(s) 135, and any number and type of dedicated nodes. As aforementioned, with respect to FIG. 1, any number and type of requests may be received at or submitted to request logic 201 for processing. For example, incoming requests may specify which services from computing device 120 are to be provided, such as document processing requests, on behalf of one or more client devices 130A-N, code execution requests, and so forth.

Communication/compatibility logic 207 may facilitate the ability to dynamically communicate the requests and stay configured with any number and type of software/application developing tools, models, data processing servers, database platforms and architectures, programming languages and their corresponding platforms, etc., while ensuring compatibility with changing technologies, parameters, protocols, standards, etc.

Figure 3:
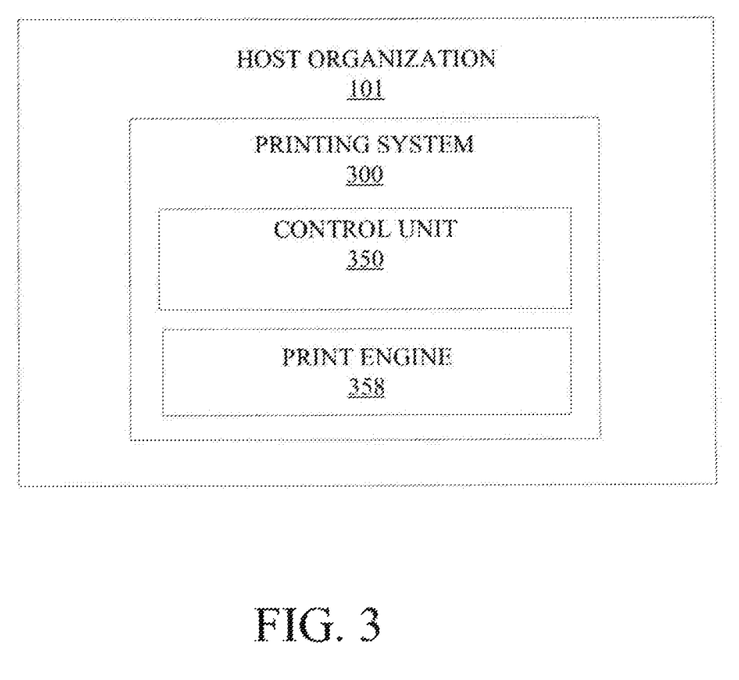
FIG. 3 illustrates one embodiment of a printing system.

According to one embodiment, host organization 101 may perform print services for client devices 130 via one or more printing systems. FIG. 3 illustrates one embodiment of such a printing system 300. Printer 300 includes a control unit 350 and a print engine 358. According to one embodiment, control unit 350 processes and renders objects received in print job data and provides sheet maps for printing to print engine 358. Control unit (e.g., DFE or digital front end) 350 is implemented to process image objects received at control unit 350 by a raster image processor (RIP) to convert an image described in a vector graphics format (e.g., shapes) into a raster image (e.g., pixels) that is to be stored as scan line data in a memory array (not shown) for output to print engine 358. In other embodiments, print engines 358 may be located at a facility associated with a customer organization 121. In such embodiments, control unit 350 processes print job information and transmits the raster images to remote print engines to produce the output.

Referring back to FIG. 2, fingerprint authentication mechanism 110 may be implemented to provide secure communications with one or more customer organizations 121. However in conventional authentication methods a combination of certificates are implemented, with the assistance of a certificate authority to provide a secure connection between a server (e.g., computing device) and a client (e.g., a client computer 130).

Figure 4:
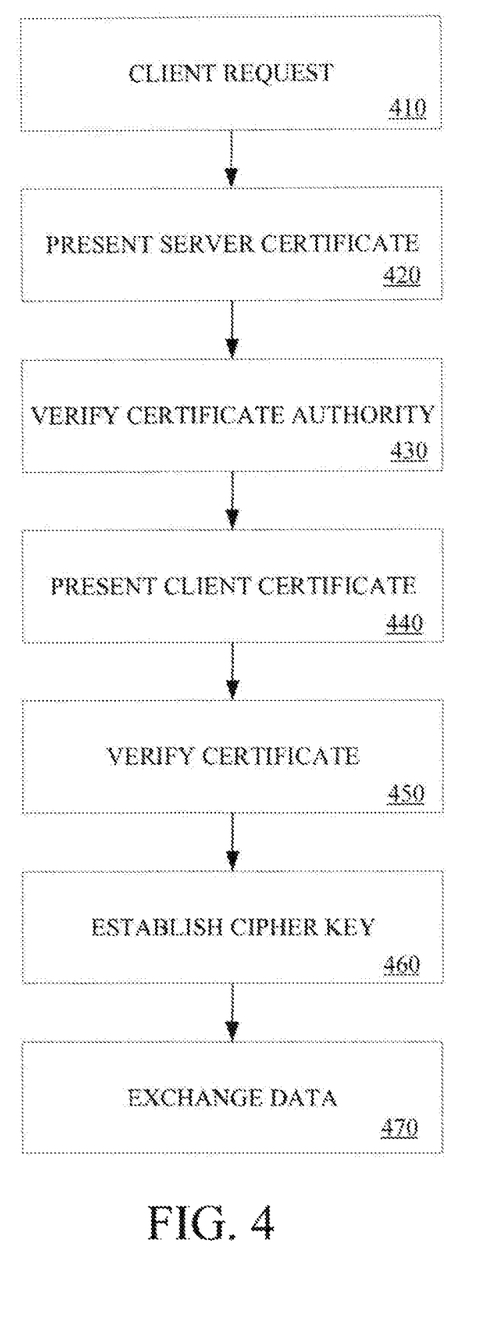
FIG. 4 is a flow diagram illustrating a conventional authentication process.

FIG. 4 is a flow diagram illustrating a conventional authentication process using certificates. At processing block 410, a client requests a secure connection with a server. At processing block 420, the server presents a server certificate to the client. At processing block 430, the client verifies the certificate with a third-party certificate authority. At processing block 440, the client presents the client certificate to the server. At processing block 450, the server verifies the client certificate. At processing block 460, a cipher key between the client and server is established. At processing block 470, data may be securely exchanged between the client and server. As discussed above, such a process is impractical when considering a large number of clients.

According to one embodiment, fingerprint authentication mechanism 110 implements a digital fingerprint identification process to securely authenticate the identity of an autonomous server. In such an embodiment, fingerprint authentication mechanism 110 generates and stores a digital fingerprint for each client. Each client stores its corresponding fingerprint for communication with computing device 120. In a further embodiment, each client-server handshake includes the server presenting a random fingerprint challenge to the client. In this embodiment, client-server communication is authenticated upon the client successfully verifying the challenge.

Referring back to FIG. 2, computing device 120 may implement request logic 201 to serve as a request interface via a web server or as a stand-alone interface, such as user interface 206, to receive requests packets or other requests from the client devices 130A-N. The request interface may further support the return of response packets or other replies and responses in an outgoing direction from computing device 120 to one or more client devices 130A-N. In a further embodiment, request logic 201 receives requests from a customer organization to authenticate and establish communication with computing device 120.

Authentication logic 201 includes fingerprint module 211 and challenge engine 212. Fingerprint module 211 generates and stores a fingerprint for each client device 130. In one embodiment, the fingerprint includes a fingerprint identifier (ID) and a fingerprint file associated with each customer organization that was signed in and is stored on the server. In a further embodiment, the fingerprint file comprises a large file (e.g., 2056 bytes). In still a further embodiment, fingerprints may be periodically replaced as a further security policy. A client device 130 stores its respective fingerprint for each subsequent communication with computing device 120.

Challenge engine 212 generates random fingerprint challenges to be presented to a client to authenticate a client-server communication. In one embodiment, the fingerprint challenge involves a random manipulation that is to be performed on a random segment of the fingerprint file. In such an embodiment, the fingerprint challenge may request a checksum operation be performed on a random number of byte positions within the fingerprint file corresponding to the client. In response, challenge engine 212 receives a response from the client and verifies whether the response includes an accurate checksum of the requested bytes. In a further embodiment, challenge engine 212 generates a new random fingerprint challenge for each client-server handshake.

Secure communication is enables upon verification. According to one embodiment challenge engine 212 verifies the accuracy of the challenge by retrieving from storage a fingerprint file corresponding to the client's fingerprint ID and performing the requested manipulation requested for the client (e.g., generates the same checksum that was requested for the client using the same algorithm). Subsequently, the checksums are compared to confirm a match.

Figure 5:
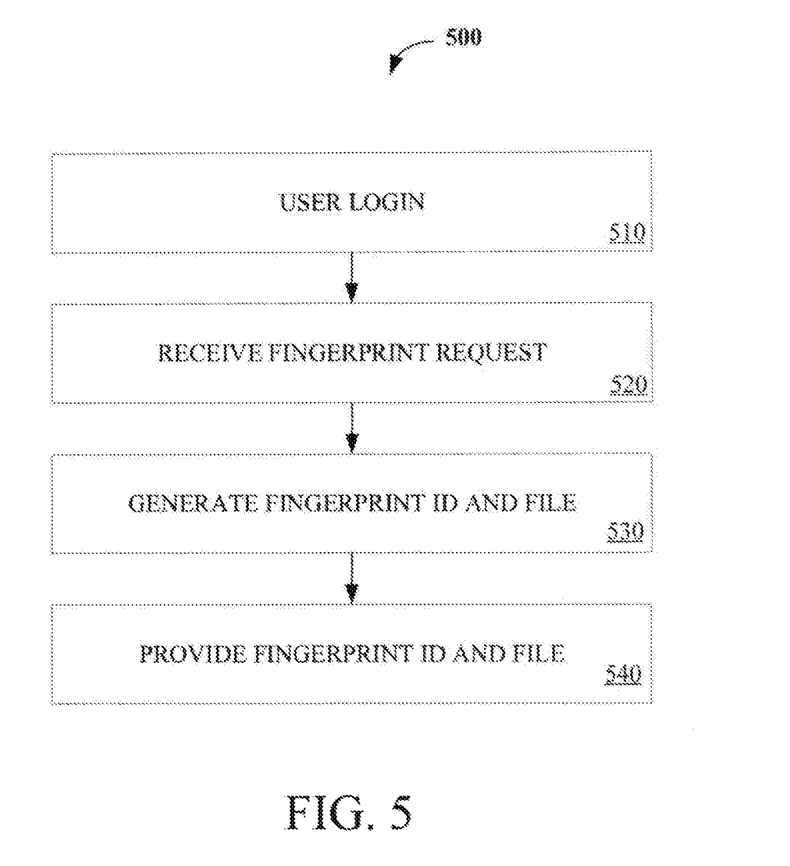
FIG. 5 is a flow diagram illustrating one embodiment of a process for establishing a client fingerprint.

FIG. 5 is a flow diagram illustrating one embodiment of a process 500 for establishing a client fingerprint. Process 500 may be performed by processing logic that may comprise hardware (e.g., circuitry, dedicated logic, programmable logic, etc.), software (such as instructions run on a processing device), or a combination thereof. In one embodiment, process 500 may be performed by fingerprint authentication mechanism 110. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 510 at which a user logs into a client application user interface at a computing device 130 (e.g., using username/password). In one embodiment, the client application signs in the user with computing device 120 using an SSL/TLS encrypted channel. At processing block 520, computing device 120 receives a fingerprint request from the client via the current authorized and encrypted session. At processing block 530, a fingerprint file and fingerprint ID to be associated with the client is generated. At processing block 530, computing device 120 responds by transmitting the fingerprint file and fingerprint ID to the client for storage.

Figure 6:
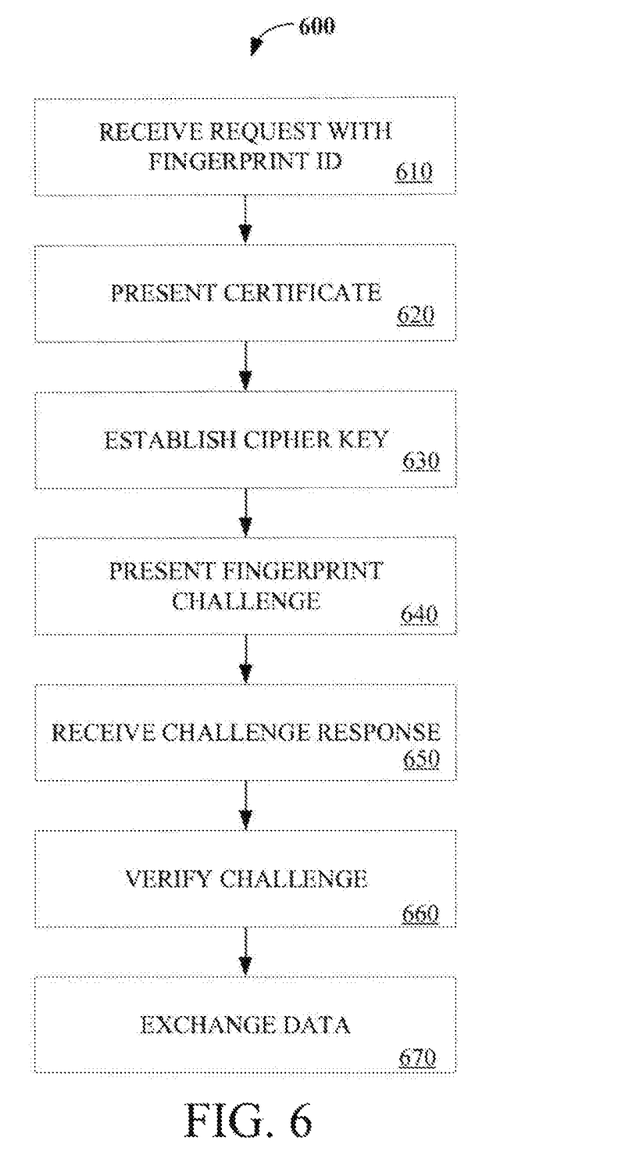
FIG. 6 is a flow diagram illustrating one embodiment of a process for performing client-server fingerprint authentication.

Once the fingerprint is stored at the client, client-server fingerprint authentication is permitted. FIG. 6 is a flow diagram illustrating one embodiment of a process 600 for performing fingerprint authentication. Process 600 may be performed by processing logic that may comprise hardware (e.g., circuitry, dedicated logic, programmable logic, etc.), software (such as instructions run on a processing device), or a combination thereof. In one embodiment, process 600 may be performed by fingerprint authentication mechanism 110. The process 600 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 are not discussed or repeated here.

Process 600 begins at processing block 610, where a request for a secure channel is received at a server (e.g., computing device 120) from a client (e.g., computing device 130). In one embodiment, the client initiates a secure channel using a standard SSL/TLS server only certificate. In a further embodiment, the request includes a fingerprint ID associated with the client. At processing block 620, the server presents a server certificate to the client. According to one embodiment, the client verifies the certificate with a third-party certificate authority, such as computing device 250 (FIG. 2).

At processing block 630, a shared cipher key is established between the client and the server (e.g., via public key cryptography. As a result, future communication is encrypted by both server and computing device 120 using the key. At processing block 640, the server generates and transmits a fingerprint challenge to the client. At processing block 650, the server receives the results of the challenge (e.g., checksum) from the client. At processing block 660, the server verifies the accuracy of the received challenge response.

Figure 7:
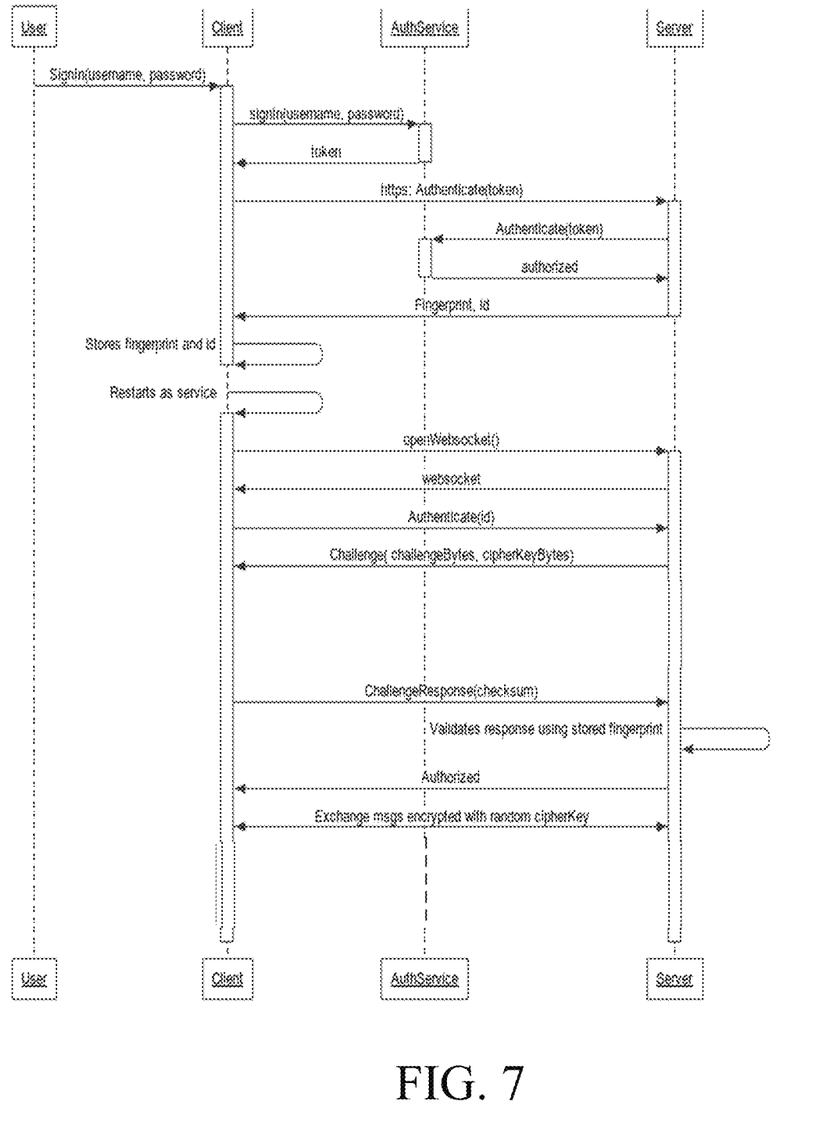
FIG. 7 is a diagram illustrating another embodiment of a process for performing client-server fingerprint authentication.

As discussed above, the server verifies the accuracy of the challenge by generating the same checksum that was requested for the client (e.g., using the same algorithm) and compares the checksums to ensure a match. At processing block 670, data exchange begins upon a determination that there is match between the checksums. However, the connection is closed upon a determination that there is no match. FIG. 7 illustrates a more detailed flow of the client-server fingerprint authentication process, including the interaction with a service authority server.

As referred to above, the handshake, random challenge and cipher key are repeated each time a new client-server connection is established. Moreover, performing a checksum based on a random number of challenge bytes and/or byte positions for every handshake makes it virtually impossible to spoof authentication without having the entire fingerprint.

Figure 8:
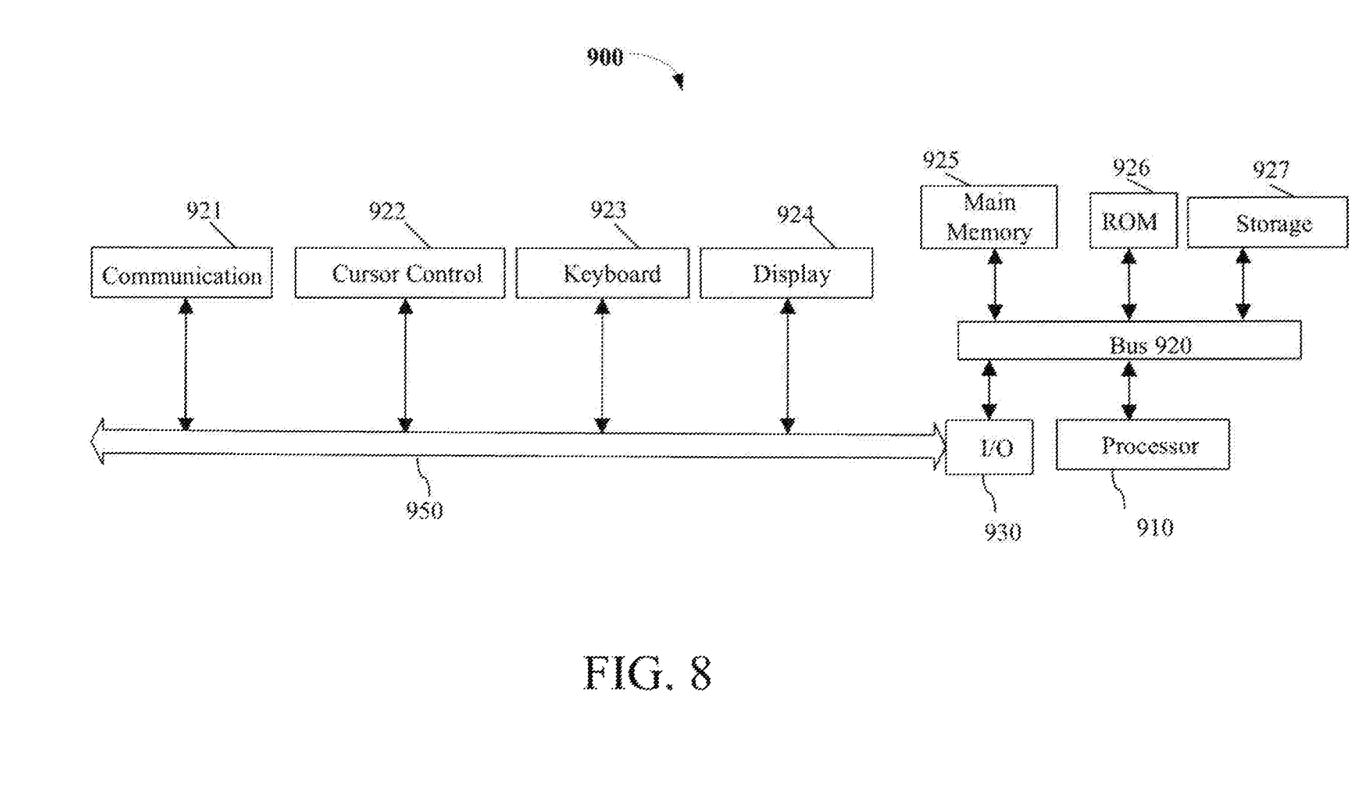
FIG. 8 illustrates a computing device suitable for implementing embodiments of the present disclosure.

FIG. 8 illustrates a computer system 900 on which computing device 120 and/or 130 may be implemented. Computer system 900 includes a system bus 920 for communicating information, and a processor 910 coupled to bus 920 for processing information.

Computer system 900 further comprises a random-access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard (or alphanumeric input device) 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A non-transitory computer-readable storage medium having stored thereon instructions that, when executed by one or more processors, cause the one or more processors to:
   receive a request to securely communicate with a client computing device, including a fingerprint identifier (ID) associated with the client computing device;
   randomly generate a fingerprint challenge, wherein the fingerprint challenge comprises a manipulation to be performed on a segment of a fingerprint file associated with the fingerprint ID;
   transmit the fingerprint challenge to the client computing device;
   receive a challenge response from the client computing device; and
   verify the challenge response.

2. The non-transitory computer-readable storage medium of claim 1, wherein the fingerprint challenge comprises a request to perform a checksum operation on a random number of byte positions within the fingerprint file.

3. The non-transitory computer-readable storage medium of claim 2, wherein verifying the challenge response comprises:
   retrieving the fingerprint file;
   calculating a checksum operation on the random number of byte positions within the fingerprint file; and
   comparing the calculated checksum operation to a checksum operation received in the fingerprint challenge response.

4. The non-transitory computer-readable storage medium of claim 1, having stored thereon instructions that, when executed by one or more processors, cause the one or more processors to establish a fingerprint with the client computing device.

5. The non-transitory computer-readable storage medium of claim 4, wherein establishing the fingerprint with the client computing device comprises:
   receiving a fingerprint request from a client via an authorized and encrypted communication session;
   generating the fingerprint file and fingerprint ID to be associated with the client computing device; and
   transmitting the fingerprint file and fingerprint ID to the client computing device via the authorized and encrypted communication session.

6. The non-transitory computer-readable storage medium of claim 1, having stored thereon instructions that, when executed by one or more processors, cause the one or more processors to:
   receive a second communication request including the fingerprint ID associated with the client computing device;
   transmit a second fingerprint challenge to the client computing device, wherein the second fingerprint challenge comprises a second randomly generated manipulation to be performed on the fingerprint file;
   receive a second challenge response from the client computing device; and
   verify the second challenge response.

7. A system comprising:
   at least one physical memory device; and
   one or more processors coupled with the at least one physical memory device, the one or more processors to receive a request to securely communicate with a client computing device, including a fingerprint identifier (ID) associated with the client computing device, randomly generate a fingerprint challenge, transmit the fingerprint challenge to the client computing device receive a challenge response from the client computing device and verify the challenge response, wherein the fingerprint challenge comprises a manipulation to be performed on a segment of a fingerprint file associated with the fingerprint ID.

8. The system of claim 7, wherein the fingerprint challenge comprises a request to perform a checksum operation on a random number of byte positions within the fingerprint file.

9. The system of claim 8, wherein verifying the challenge response comprises retrieving the fingerprint file, calculating a checksum operation on the random number of byte positions within the fingerprint file and comparing the calculated checksum operation to a checksum operation received in the fingerprint challenge response.

10. The system of claim 7, wherein the one or more processors further to establish a fingerprint with the client computing device.

11. The system of claim 10, wherein establishing the fingerprint with the client computing device comprises receiving a fingerprint request from a client via an authorized and encrypted communication session, generating the fingerprint file and fingerprint ID to be associated with the client computing device and transmitting the fingerprint file and fingerprint ID to the client computing device via the authorized and encrypted communication session.

12. The system of claim 7, wherein the one or more processors further to receive a second communication request including the fingerprint ID associated with the client computing device, transmit a second fingerprint challenge to the client computing device, wherein the second fingerprint challenge comprises a second randomly generated manipulation to be performed on the fingerprint file, receive a second challenge response from the client computing device and verify the second challenge response.

13. A method to establish secure client-server communication, comprising:
    a server computing device receiving a request to securely communicate with a client computing device, including a fingerprint identifier (ID) associated with the client computing device;
    the server computing device randomly generating the fingerprint challenge, wherein the fingerprint challenge comprises a manipulation to be performed on a segment of a fingerprint file associated with the fingerprint ID;
    the server computing device transmitting the fingerprint challenge to the client computing device;
    the server computing device receiving a challenge response from the client computing device; and
    the server computing device verifying the challenge response.

14. The method of claim 13, wherein the fingerprint challenge comprises a request to perform a checksum operation on a random number of byte positions within the fingerprint file.

15. The method of claim 14, wherein verifying the challenge response comprises:
    the server computing device retrieving the fingerprint file;
    the server computing device calculating a checksum operation on the random number of byte positions within the fingerprint file; and
    the server computing device comparing the calculated checksum operation to a checksum operation received in the fingerprint challenge response.

16. The method of claim 13, further comprising the server computing device establishing a fingerprint with the client computing device.

17. The method of claim 16, wherein establishing the fingerprint with the client computing device comprises:
    the server computing device receiving a fingerprint request from a client via an authorized and encrypted communication session;
    the server computing device generating the fingerprint file and fingerprint ID to be associated with the client computing device; and
    the server computing device transmitting the fingerprint file and fingerprint ID to the client computing device via the authorized and encrypted communication session.

* * * * *